(12) United States Patent
Wang et al.

(10) Patent No.: US 12,213,142 B2
(45) Date of Patent: Jan. 28, 2025

(54) DOWNLINK CONTROL CHANNEL DETECTION METHOD, TERMINAL, AND NETWORK SIDE DEVICE

(71) Applicant: DATANG MOBILE COMMUNICATIONS EQUIPMENT CO., LTD., Beijing (CN)

(72) Inventors: Jiaqing Wang, Beijing (CN); Lei Wang, Beijing (CN); Fangchen Cheng, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 91 days.

(21) Appl. No.: 16/973,542

(22) PCT Filed: Apr. 22, 2019

(86) PCT No.: PCT/CN2019/083622
§ 371 (c)(1),
(2) Date: Dec. 9, 2020

(87) PCT Pub. No.: WO2019/237831
PCT Pub. Date: Dec. 19, 2019

(65) Prior Publication Data
US 2021/0258925 A1   Aug. 19, 2021

(30) Foreign Application Priority Data
Jun. 11, 2018   (CN) .......................... 201810596638.4

(51) Int. Cl.
*H04W 4/00*   (2018.01)
*H04J 13/00*   (2011.01)
(Continued)

(52) U.S. Cl.
CPC ......... *H04W 72/23* (2023.01); *H04J 13/0022* (2013.01); *H04J 13/0059* (2013.01); *H04L 5/0048* (2013.01); *H04W 52/0235* (2013.01)

(58) Field of Classification Search
None
See application file for complete search history.

(56) References Cited

U.S. PATENT DOCUMENTS 11,564,170 B2 *   1/2023   Zhang ................... H04W 76/28
2012/0275366 A1 *   11/2012   Anderson ......... H04W 52/0219
370/311

(Continued)

FOREIGN PATENT DOCUMENTS

CN   101478808 A   7/2009
CN   102036346 A   4/2011
(Continued)

OTHER PUBLICATIONS

Notice of Reasons for Refusal issued on Feb. 8, 2022 in Japanese Application No. 2020-568507.
(Continued)

*Primary Examiner* — Bob A Phunkulh
(74) *Attorney, Agent, or Firm* — Harness, Dickey & Pierce, P.L.C.

(57) ABSTRACT

The embodiments of the present disclosure provides a downlink control channel detection method, a terminal and a network side device. The method includes: performing energy-saving signal detection by a terminal, wherein the energy-saving signal is at least used to indicate detection information of a downlink control channel; detecting the downlink control channel by the terminal according to the detection information if the energy-saving signal is detected.

16 Claims, 3 Drawing Sheets performing energy-saving signal detection by a terminal — 201 detecting the downlink control channel by the terminal according to the detection information if the energy-saving signal is detected — 202

(51) Int. Cl.
*H04L 5/00* (2006.01)
*H04W 52/02* (2009.01)
*H04W 72/23* (2023.01)

(56) References Cited

U.S. PATENT DOCUMENTS

| | | | |
|---|---|---|---|
| 2014/0247796 A1* | 9/2014 | Ouchi | H04L 5/0053 |
| | | | 370/329 |
| 2016/0066242 A1* | 3/2016 | Su | H04W 36/0085 |
| | | | 455/436 |
| 2016/0174280 A1* | 6/2016 | Singh | H04W 76/15 |
| | | | 370/329 |
| 2016/0192433 A1* | 6/2016 | Deenoo | H04W 24/08 |
| | | | 370/329 |
| 2017/0019919 A1* | 1/2017 | Liang | H04W 72/23 |
| 2017/0070312 A1* | 3/2017 | Yi | H04J 11/0069 |
| 2017/0188350 A1* | 6/2017 | Kim | H04W 72/042 |
| 2017/0202055 A1 | 7/2017 | Feuersaenger et al. | |
| 2017/0245319 A1* | 8/2017 | Yasukawa | H04W 52/0229 |
| 2017/0273027 A1* | 9/2017 | Kim | H04W 52/16 |
| 2017/0374569 A1 | 12/2017 | Lee et al. | |
| 2018/0049126 A1* | 2/2018 | Cheng | H04W 76/28 |
| 2018/0124739 A1 | 5/2018 | Tabet et al. | |
| 2018/0132292 A1* | 5/2018 | Yang | H04W 76/10 |
| 2018/0270756 A1* | 9/2018 | Bhattad | H04W 76/27 |
| 2018/0332533 A1* | 11/2018 | Bhattad | H04W 52/0235 |
| 2018/0332549 A1* | 11/2018 | Bhattad | H04W 56/001 |
| 2018/0332655 A1* | 11/2018 | Ang | H04W 52/0229 |
| 2020/0022082 A1* | 1/2020 | Ljung | H04J 13/16 |
| 2020/0029302 A1* | 1/2020 | Cox | H04W 76/27 |
| 2020/0053647 A1* | 2/2020 | Chae | H04W 76/28 |
| 2020/0092938 A1* | 3/2020 | Tang | H04W 56/005 |
| 2020/0145921 A1* | 5/2020 | Zhang | H04W 52/0229 |
| 2020/0163017 A1* | 5/2020 | Priyanto | H04W 88/04 |
| 2020/0204292 A1 | 6/2020 | Jiang et al. | |
| 2020/0229133 A1* | 7/2020 | Yi | H04W 76/28 |
| 2020/0383054 A1* | 12/2020 | Tang | H04W 76/28 |
| 2021/0014927 A1* | 1/2021 | Tang | H04W 76/27 |
| 2021/0195521 A1* | 6/2021 | Müller | H04W 76/28 |
| 2021/0195527 A1* | 6/2021 | Tang | H04W 52/0235 |

FOREIGN PATENT DOCUMENTS

| | | |
|---|---|---|
| CN | 103889039 A | 6/2014 |
| CN | 104869578 A | 8/2015 |
| CN | 105634678 A | 6/2016 |
| CN | 109286968 A | 1/2019 |

OTHER PUBLICATIONS

Vivo, "Remaining issues for wake-up signal for efeMTC," 3GPP TSG RAN WG1 Meeting #90 bis, R1-1717456, Oct. 9-13, 2017.
Chinese Office Action dated Jun. 11, 2021 for CN Application No. 201910252571.7.
Vivo, "Remaining details on wake-up signal functions for feNB-IoT", Agenda Item 6.2.6.1.1.1, 3GPP TSG RAN WG1 Meeting #90bis, R1-1717457, Prague, Czech Republic, Oct. 9-13, 2017.
Extended European Search Report dated Jun. 29, 2021 for Application No. EP 19 81 8517.
WI rapporteur (Ericsson), RAN1 agreements for Rel-13 NB-IoT, Agenda Item 7.2.1, 3GPP TSG-RAN WG1 Meeting #84bis, R1-163943, Busan, Korea, Apr. 11-15, 2016.
CATT, "Search space design for NR-PDCCH", Agenda Item 6.1.3.1.2.2, 3GPP TSG RAN WG1 Meeting #90, R1-1712393, Prague, Czechia, Aug. 21-25, 2017.
LG Electronics, "Design of power saving signal/channel", Agenda Item 6.2.6.1.1.3, Prague, CZ, Oct. 9-13, 2017.
LG Electronics, "Discussion on wake up signal in MTC", Agenda Item 6.2.6.3, 3GPP TSG RAN WG1 Meeting #93, R1-1806587, Busan, Korea, May 21-25, 2018.
ZTE, "Power consumption reduction for physical channels for MTC", Agenda item 5.2.6.2, 3GPP TSG RAN WG1 Meeting #90, R1-1713014, Prague, Czech Republic, Aug. 21-25, 2017.
Written Opinion and International Search report for International Patent Application No. PCT/CN2019/083622 dated Dec. 15, 2020.

\* cited by examiner

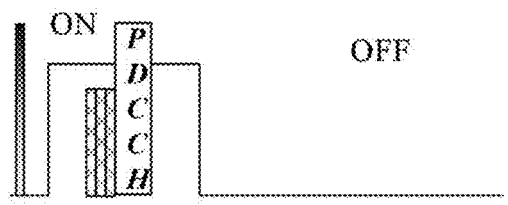
Fig. 4
sending an energy-saving signal by a network side device, wherein the energy-saving signal is at least used to indicate detection information of a downlink control channel, so that a terminal detects the downlink control channel according to the detection information if the terminal detects the energy-saving signal — 501
Fig. 5
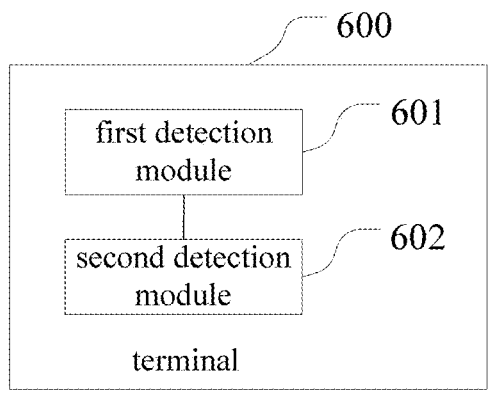
Fig. 6
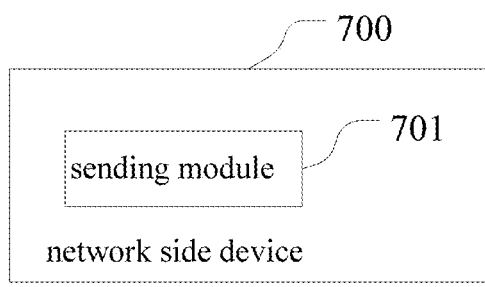
Fig. 7

DOWNLINK CONTROL CHANNEL DETECTION METHOD, TERMINAL, AND NETWORK SIDE DEVICE

CROSS-REFERENCE TO RELATED APPLICATIONS

This application is the U.S. national phase of PCT Application No. PCT/CN2019/083622 filed on Apr. 22, 2019, which claims priority to Chinese Patent Application No. 201810596638.4 filed on Jun. 11, 2018, the disclosures of which are incorporated in their entirety by reference herein.

TECHNICAL FIELD

The present disclosure relates to the field of communication technology, and in particular to a downlink control channel detection method, a terminal, and a network side device.

BACKGROUND

In the 5G New Radio (NR) system, the working state of a terminal may include an idle mode (RRC_IDLE), an inactive mode (RRC_Inactive), and a connected mode (RRC_Connected). However, in all these states, the terminal needs to detect the downlink control channel. In the communication system of the related art, the detection location for detecting the downlink control channel is pre-configured, and many detection locations are pre-configured. The terminal needs to perform detection at each detection location. For example: in a Discontinuous Reception (DRX) scenario, the terminal needs to detect the downlink control channel in each On duration period. Since the terminal needs to detect the downlink control channel at each detection location, the power consumption of the terminal is relatively high.

SUMMARY

The embodiments of the present disclosure provides a downlink control channel detection method, a terminal, and a network side device to solve the problem of high power consumption of the terminal.

To this end, an embodiment of the present disclosure provides a downlink control channel detection method including:
performing energy-saving signal detection by a terminal, wherein the energy-saving signal is at least used to indicate detection information of a downlink control channel; and
detecting the downlink control channel by the terminal according to the detection information if the energy-saving signal is detected.

Optionally, the energy-saving signal is further used to indicate data arrival.

Optionally, the detection information includes at least one of:
an aggregation level (AL) and/or a candidate location.

Optionally, the energy-saving signal includes at least one of:
a target sequence, an input parameter of a first sequence, and a cyclic shift value of a second sequence, wherein the target sequence is a function of a third sequence.

Optionally, the first sequence includes a pseudo-noise (PN) sequence, an orthogonal sequence, or a constant amplitude zero auto correlation (CAZAC) sequence; and/or
the second sequence includes an orthogonal sequence, a CAZAC sequence, or a PN sequence; and/or
the third sequence includes a demodulation reference signal (DMRS) sequence of the downlink control channel.

Optionally, the detection information includes the AL, the energy-saving signal includes the target sequence, the target sequence is used to indicate the AL and data arrival;
the performing energy-saving signal detection by the terminal includes:
performing, by the terminal, a correlation peak detection on the target
sequence using a sequence corresponding to the DMRSs of multiple ALs, and using an AL corresponding to a maximum correlation peak among the multiple ALs as the AL indicated by the target sequence, wherein the maximum correlation peak is greater than a preset threshold.

Optionally, the detection information includes the AL, the energy-saving signal includes the cyclic shift value of the second sequence, the cyclic shift value of the second sequence is used to indicate the AL; or
the energy-saving signal includes the first sequence, wherein an initial value of the first sequence is a terminal identification of the terminal, the input parameter of the first sequence includes the detection information.

Optionally, the energy-saving signal includes a discovery signal, a signal subset of discovery signal, or an on-demand reference signal (On-demand RS).

Optionally, the energy-saving signal includes at least a first signal subset and a second signal subset, the first signal subset is located before the second signal subset, the second signal subset is at least used to indicate the detection information;
detecting the downlink control channel by the terminal according to the detection information if the energy-saving signal is detected includes:
initiating power ramping by the terminal if the terminal receives the first signal subset;
detecting the downlink control channel by the terminal according to the detection information if the terminal receives the second signal subset.

Optionally, the energy-saving signal includes at least one signal subset, wherein a signal subset for indicating the detection information is frequency-division-multiplexed with the downlink control channel, or the signal subset for indicating the detection information is transmitted before the downlink control channel.

An embodiment of the present disclosure further provides a downlink control channel detection method, including:
sending an energy-saving signal by a network side device, wherein the energy-saving signal is at least used to indicate detection information of a downlink control channel, so that a terminal detects the downlink control channel according to the detection information if the terminal detects the energy-saving signal.

Optionally, the energy-saving signal is further used to indicate data arrival.

Optionally, the detection information includes at least one of:
an AL and/or a candidate location.

Optionally, the energy-saving signal includes at least one of:
a target sequence, an input parameter of a first sequence, and a cyclic shift value of a second sequence, wherein the target sequence is a function of a third sequence.

Optionally, the first sequence includes a PN sequence, an orthogonal sequence, or a CAZAC sequence; and/or the second sequence includes an orthogonal sequence, a CAZAC sequence, or a PN sequence; and/or the third sequence includes a demodulation reference signal (DMRS) sequence of the downlink control channel.

Optionally, the detection information includes the AL, the energy-saving signal includes the target sequence, the target sequence is used to indicate the AL and data arrival; or the detection information includes the AL, the energy-saving signal includes the cyclic shift value of the second sequence, the cyclic shift value of the second sequence is used to indicate the AL; or the energy-saving signal includes the first sequence, wherein an initial value of the first sequence is a terminal identification of the terminal, the input parameter of the first sequence includes the detection information.

Optionally, the energy-saving signal includes a discovery signal, a signal subset of discovery signal, or an On-demand RS.

Optionally, the energy-saving signal includes at least a first signal subset and a second signal subset, the first signal subset is located before the second signal subset, the second signal subset is at least used to indicate the detection information.

Optionally, the energy-saving signal includes at least one signal subset, wherein a signal subset for indicating the detection information is frequency-division-multiplexed with the downlink control channel, or the signal subset for indicating the detection information is transmitted before the downlink control channel.

An embodiment of the present disclosure further provides a terminal, including:

a first detection module configured to perform energy-saving signal
detection, wherein the energy-saving signal is at least used to indicate detection information of a downlink control channel;

a second detection module configured to detect the downlink control channel according to the detection information if the energy-saving signal is detected.

Optionally, the detection information includes at least one of:

an aggregation level (AL) and/or a candidate location.

Optionally, the energy-saving signal includes at least one of:

a target sequence, an input parameter of a first sequence, and a cyclic shift value of a second sequence, wherein the target sequence is a function of a third sequence.

Optionally, the energy-saving signal includes a discovery signal, a signal subset of discovery signal, or an on-demand reference signal (On-demand RS).

An embodiment of the present disclosure further provides a network side device, including:

a sending module configured to send an energy-saving signal, wherein the energy-saving signal is at least used to indicate detection information of a downlink control channel, so that a terminal detects the downlink control channel according to the detection information if the terminal detects the energy-saving signal.

Optionally, the detection information includes at least one of:

an AL and/or a candidate location.

Optionally, the energy-saving signal includes at least one of:

a target sequence, an input parameter of a first sequence, and a cyclic shift value of a second sequence, wherein the target sequence is a function of a third sequence.

Optionally, the energy-saving signal includes a discovery signal, a signal subset of discovery signal, or an On-demand RS.

An embodiment of the present disclosure further provides a terminal, including: a transceiver, a storage, a processor, and a program stored on the storage and capable of running on the processor, wherein, the transceiver is configured to perform energy-saving signal detection, wherein the energy-saving signal is at least used to indicate detection information of a downlink control channel; and the transceiver is further configured to detect the downlink control channel according to the detection information if the energy-saving signal is detected.

Optionally, the energy-saving signal is further used to indicate data arrival.

Optionally, the detection information includes at least one of:

an aggregation level (AL) and/or a candidate location.

Optionally, the energy-saving signal includes at least one of:

a target sequence, an input parameter of a first sequence, and a cyclic shift value of a second sequence, wherein the target sequence is a function of a third sequence.

Optionally, the first sequence includes a pseudo-noise (PN) sequence, an orthogonal sequence, or a CAZAC sequence; and/or the second sequence includes an orthogonal sequence, a CAZAC sequence, or a PN sequence; and/or the third sequence includes a demodulation reference signal (DMRS) sequence of the downlink control channel.

Optionally, the detection information includes the AL, the energy-saving signal includes the target sequence, the target sequence is used to indicate the AL and data arrival;

the performing energy-saving signal detection includes:

performing correlation peak detection on the target sequence using a sequence corresponding to the DMRSs of multiple ALs, and using an AL corresponding to a maximum correlation peak among the multiple ALs as the AL indicated by the target sequence, wherein the maximum correlation peak is greater than a preset threshold.

Optionally, the detection information includes the AL, the energy-saving signal includes the cyclic shift value of the second sequence, the cyclic shift value of the second sequence is used to indicate the AL; or the energy-saving signal includes the first sequence, wherein an initial value of the first sequence is a terminal identification of the terminal, the input parameter of the first sequence includes the detection information.

Optionally, the energy-saving signal includes a discovery signal, a signal subset of discovery signal, or an on-demand reference signal (On-demand RS).

Optionally, the energy-saving signal includes at least a first signal subset and a second signal subset, the first signal subset is located before the second signal subset, the second signal subset is at least used to indicate the detection information;

the detecting the downlink control channel according to the detection information if the energy-saving signal is detected includes:

initiating power ramping if the terminal receives the first signal subset;

detecting the downlink control channel according to the detection information if the terminal receives the second signal subset.

Optionally, the energy-saving signal includes at least one signal subset, wherein a signal subset for indicating the detection information is frequency-division-multiplexed with the downlink control channel, or the signal subset for indicating the detection information is transmitted before the downlink control channel.

An embodiment of the present disclosure further provides a network side device, including: a transceiver, a storage, a processor, and a program stored on the storage and capable of running on the processor, wherein, the transceiver is configured to send an energy-saving signal, wherein the energy-saving signal is at least used to indicate detection information of a downlink control channel, so that a terminal detects the downlink control channel according to the detection information if the terminal detects the energy-saving signal.

Optionally, the energy-saving signal is further used to indicate data arrival.

Optionally, the detection information includes at least one of:

an AL and/or a candidate location.

Optionally, the energy-saving signal includes at least one of:

a target sequence, an input parameter of a first sequence, and a cyclic shift value of a second sequence, wherein the target sequence is a function of a third sequence.

Optionally, the first sequence includes a PN sequence, an orthogonal sequence, or a CAZAC sequence; and/or the second sequence includes an orthogonal sequence, a CAZAC sequence, or a PN sequence; and/or the third sequence includes a demodulation reference signal (DMRS) sequence of the downlink control channel.

Optionally, the detection information includes the AL, the energy-saving signal includes the target sequence, the target sequence is used to indicate the AL and data arrival; or the detection information includes the AL, the energy-saving signal includes the cyclic shift value of the second sequence, the cyclic shift value of the second sequence is used to indicate the AL; or the energy-saving signal includes the first sequence, wherein an initial value of the first sequence is a terminal identification of the terminal, the input parameter of the first sequence includes the detection information.

Optionally, the energy-saving signal includes a discovery signal, a signal subset of discovery signal, or an On-demand RS.

Optionally, the energy-saving signal includes at least a first signal subset and a second signal subset, the first signal subset is located before the second signal subset, the second signal subset is at least used to indicate the detection information.

Optionally, the energy-saving signal includes at least one signal subset, wherein a signal subset for indicating the detection information is frequency-division-multiplexed with the downlink control channel, or the signal subset for indicating the detection information is transmitted before the downlink control channel.

An embodiment of the present disclosure further provides a computer readable storage medium having a computer program stored thereon, the program implementing, when executed by a processor, the steps in the downlink control channel detection method at a terminal side provided by an embodiment of the present disclosure, or, the program implementing, when executed by a processor, the steps in the downlink control channel detection method at a network side device side provided by an embodiment of the present disclosure.

In the embodiments of the present disclosure, the terminal performs energy-saving signal detection, wherein the energy-saving signal is at least used to indicate the detection information of the downlink control channel; if the energy-saving signal is detected, the terminal detects the downlink control channel according to the detection information. In this way, it can be realized that the downlink control channel detection is triggered by the above energy-saving signal, and can be directly performed by the detection information indicated by the energy-saving signal, thereby reducing the power consumption of the terminal.

BRIEF DESCRIPTION OF THE DRAWINGS

FIG. 4 is a schematic diagram of another WUS according to an embodiment of the present disclosure;

FIG. 5 is a flowchart of another downlink control channel detection method according to an embodiment of the present disclosure;

FIG. 6 is a structural diagram of a terminal according to an embodiment of the present disclosure;

FIG. 7 is a structural diagram of a network side device according to an embodiment of the present disclosure;

DETAILED DESCRIPTION

In order that the technical problems to be solved by the present disclosure, the technical solutions and the advantages are clearer, a detailed description will be given below with reference to the drawings and specific embodiments.

Figure 1:
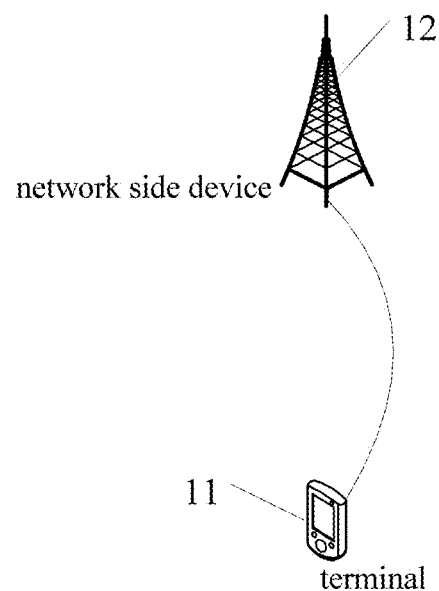
FIG. 1 is a schematic diagram of a network structure to which an embodiment of the present disclosure is applicable.

Referring to FIG. 1, it is a schematic diagram of a network structure to which an embodiment of the present disclosure is applicable, and which includes a terminal 11 and a network side device 12, as shown in FIG. 1, wherein the terminal 11 may be a User Equipment (UE) or other terminal equipment, for example, a terminal side device such as a mobile phone, a Tablet Personal Computer, a Laptop Computer, a personal digital assistant (PDA), a Mobile Internet Device (MID) or a Wearable Device. It should be noted that the specific types of terminals are not limited in the embodiments of the present disclosure. The network side device 12 may be a base station, such as a macro site, LTE eNB, 5G NR NB, etc.; the network side device may also be a micro site, such as low power node (LPN), pico site, femto site, etc., or the network side device may also be an access point (AP); the base station may also be a network node composed of a central unit (CU) and multiple Transmission Reception Points (TRPs) managed and controlled by it. It should be noted that the specific types of network side devices are not limited in the embodiments of the present disclosure.

Figure 2:
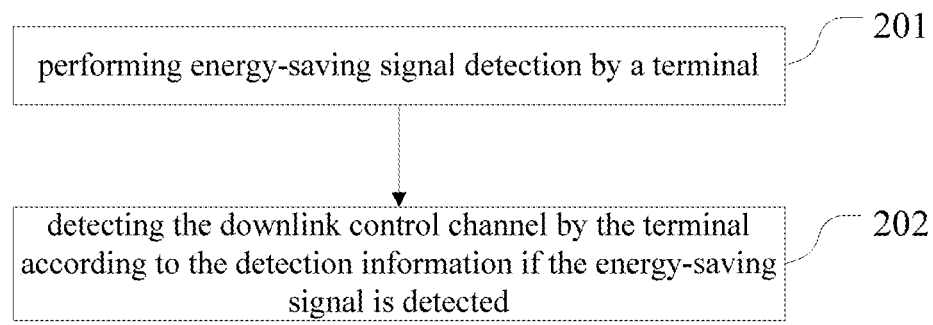
FIG. 2 is a flowchart of a downlink control channel detection method according to an embodiment of the present disclosure.

Referring to FIG. 2, it is a flowchart of a downlink control channel detection method according to an embodiment of the present disclosure, as shown in FIG. 2, including the following steps:

201, performing energy-saving signal detection by a terminal, wherein
the energy-saving signal is at least used to indicate detection information of a downlink control channel;

202, detecting the downlink control channel by the terminal according to the detection information if the energy-saving signal is detected.

In the embodiment of the present disclosure, the above energy-saving signal may be a signal for activating (or triggering) PDCCH blind decoding. If the terminal detects the energy-saving signal, performs the blind decoding on the PDCCH within the above activation time. For example, the above energy-saving signal may be a Wakeup Signal (WUS), and thus the energy-saving signal window may be a WUS window. Of course, this is not limited. For example, the above energy-saving signal may also be another signal defined in the protocol, or another signal agreed in advance by the network side device and the terminal. In addition, the above energy saving signal may be a UE specific signal.

The above detection information may be information related to downlink control channel detection. Optionally, in the embodiment of the present disclosure, the detection information includes: an AL and/or a candidate location. In this way, with this AL and/or the candidate location, the terminal can only need to detect this AL without detecting other ALs, which reduces the complexity of blind detection of the downlink control channel to save the power consumption of the terminal. It can also be realized that the terminal only needs to detect the candidate location indicated by the above energy-saving signal, and does not need to detect other candidate locations, which reduces the complexity of blind detection of the downlink control channel, thereby saving the power consumption of the terminal. Of course, in the embodiment of the present disclosure, the above detection information is not limited to ALs and/or candidate locations, for example, it may also be other information parameters associated with detecting downlink control channels. In addition, in the embodiment of the present disclosure, detecting the downlink control channel may be blindly detecting the downlink control channel.

In the embodiment of the present disclosure, the above energy-saving signal indicating the detection information of a downlink control channel may be: indicating the detection information in an explicit or implicit manner, and thus the energy-saving signal indicating the detection information may also be understood as the energy-saving signal carrying (or including) the above detection information. Optionally, the above energy-saving signal is used to indicate data arrival and the detection information. Therefore, after receiving the energy-saving signal, the terminal can determine that the data is about to arrive, thereby detecting the downlink control channel.

The step 202 of detecting the downlink control channel by the terminal according to the detection information if the energy-saving signal is detected may be understood as follows: if the terminal detects the above energy-saving signal, it activates (or triggers) the downlink control channel detection, and performs detection according to the above detection information. In this way, It can be realized that the terminal can detect the downlink control channel only after detecting the energy-saving signal, that is, the terminal can determine the arrival time of the downlink control channel through the energy-saving signal.

Through the above steps, it can be realized that the downlink control channel is detected only after the energy-saving signal is detected, and the detection is performed according to the above detection information, thereby reducing the time that the terminal needs to detect the downlink control channel. Also, there is no need to perform detection according to multiple pieces of detection information, reducing the complexity of blind detection of the downlink control channel, thereby saving the power consumption of the terminal.

It should be noted that in the embodiment of the present disclosure, the downlink control channel may be a Physical Downlink Control Channel (PDCCH), but it is not limited. In the embodiment of the present disclosure, the downlink control channel may refer to various possible definitions of existing and future control channels, such as: Enhanced Physical Downlink Control Channel (ePDCCH) or MTC Physical Downlink Control Channel (MPDCCH) and so on.

In addition, in the embodiment of the present disclosure, the state of the above terminal may be a connected mode (RRC_Connected) or a non-connected mode, such as an idle mode (RRC_IDLE) or an inactive mode (RRC_Inactive). In addition, the embodiment of the present disclosure can support licensed bands, and can also support unlicensed bands, and can be applied to NR technology and other communication systems, such as LTE.

As an optional implementation, the energy-saving signal includes at least one of:
a target sequence, an input parameter of a first sequence, and a cyclic shift value of a second sequence, wherein the target sequence is a function of a third sequence.

As an optional implementation, the energy-saving signal indicates the detection information through at least one of:
a target sequence, an input parameter of a first sequence, and a cyclic shift value of a second sequence, wherein the target sequence is a function of a third sequence.

Wherein, the above target sequence may be obtained by performing the above function operation on the above third sequence. For example, the above function may be a function processing such as cyclic repetition, or truncation, or orthogonal spreading, etc.

In addition, the above first sequence, second sequence, and third sequence may be sequences defined in the protocol, or may be sequences agreed in advance by the network side device and the terminal. For example, the first sequence includes a PN sequence, an orthogonal sequence, or a CAZAC sequence; and/or
the second sequence includes an orthogonal sequence, a CAZAC sequence, or a PN sequence; and/or
the third sequence includes a DMRS sequence of the downlink control channel.

Wherein, in the embodiment of the present disclosure, the PN sequence may be a general term for pseudo-random sequence, for example, M sequence or gold sequence belongs to the PN sequence, while the orthogonal sequence may include many sequences, such as Hadamard sequence or Walsh sequence, etc., that are commonly used.

It should be noted that, since the above target sequence may be a function of the DMRS sequence, in this embodiment, the above energy-saving signal may be constructed by the DMRS sequence. Because the energy-saving signal may be the above target sequence, the above energy-saving signal which is constructed by the DMRS sequence can indicate both data arrival and the above detection information. In this way, there is no need to add the corresponding relationship between the energy-saving signal and the detection information, because there is a corresponding relationship between the DMRS sequence and the detection information, for example, there is a corresponding relationship between DMRS and AL. Therefore, after the terminal detects the above energy-saving signal, it can determine the detection information indicated by it, thereby reducing complexity and saving power consumption of the terminal.

Of course, in the embodiment of the present disclosure, the first sequence, the second sequence, and the third sequence are not limited. For example, the first sequence, the second sequence, and the third sequence may also be ZC sequences or synchronization sequences with equivalent functions, etc.

In this implementation, the detection information is indicated by at least one of the target sequence, the input parameter of the first sequence, and the cyclic shift value of the second sequence, so that there is no need to define a new sequence when indicating the detection information, thereby reducing the complexity of detecting the downlink control channel to further reduce the power consumption of the terminal. Of course, the target sequence, the input parameter of the first sequence, and the cyclic shift value of the second sequence also indicate the arrival of data.

Optionally, the detection information includes an AL, the energy-saving signal includes the target sequence, the target sequence is used to indicate the AL and data arrival;

the performing energy-saving signal detection by the terminal includes:

performing, by the terminal, a correlation peak detection on the target sequence using a sequence corresponding to the DMRSs of multiple ALs, and using an AL corresponding to a maximum correlation peak among the multiple ALs as the AL indicated by the target sequence, wherein the maximum correlation peak is greater than a preset threshold.

Wherein the above sequence corresponding to the DMRS may be the DMRS sequence of ALs, or may be a sequence having a specific corresponding relationship with the DMRS of ALs, which is not limited.

In this implementation, it can be realized that, when the target sequence is a function of the DMRS sequence, the terminal uses the sequence corresponding to the DMRS of the ALs to perform correlation peak detection on the target sequence. When the above maximum correlation peak is detected, it is determined that the terminal detects the above energy-saving signal. In addition, the AL indicated by the energy-saving signal can also be determined, so that there is no need to blindly decode other ALs, thereby reducing the complexity of detecting the downlink control channel and further saving the power consumption of the terminal.

In addition, it should be noted that in this embodiment, since the target sequence is a function of the DMRS sequence, it can be realized that no other sequences need to be defined or referenced when detecting the downlink control channel, thereby reducing complexity.

For example: before sending the PDCCH/Physical Downlink Shared Channel (PDSCH) to the terminal, the base station sends an energy-saving signal on a definite resource.

The energy-saving signal may be a UE specific signal. The signal is the function of the DMRS corresponding to the PDCCH of the terminal. For example, it is preset that the signal is a sequence of length N (which can occupy M OFDM symbols, M>=1), and the signal is a function of the DMRS corresponding to the PDCCH. The above functional relationship is expressed as a simple function: assuming that the length of the corresponding DMRS sequence of the terminal under the AL of the PDCCH is less than N, a simple repetition method is adopted, such as cyclically repeating the original DMRS sequence to obtain a target sequence of length N. Assuming N=5, DMRS=[x1 x2 x3], the target sequence is [x1 x2 x3 x1 x2]; if the length of the DMRS sequence corresponding to the terminal on the PDCCH is greater than N, the direct truncation method is adopted to obtain the sequence. The terminal blindly decodes the sequence on the corresponding resource, and a simple method uses the sequence corresponding to the DMRS of possible different aggregation levels of the PDCCH to perform the correlation peak detection with the received sequence of length N. When the correlation peak is the maximum and greater than a certain threshold, it is considered that the data of the terminal is coming soon, and the aggregation level corresponding to the maximum correlation peak is the aggregation level corresponding to the PDCCH. The terminal directly uses this aggregation level to detect the PDCCH, and no longer blindly decodes other aggregation levels. The above functional relationship is just a simple example. For example, orthogonal spreading of the DMRS sequence can also obtain a sequence of length N. All functional relationships of the DMRS are within the protective scope of the present disclosure.

Optionally, the detection information includes the AL, the energy-saving signal includes the cyclic shift value of the second sequence, the cyclic shift value of the second sequence is used to indicate the AL.

Wherein, the above cyclic shift value may also be referred to as a cyclic shift parameter.

In this implementation, it can be realized that, when the detection information includes AL, the energy-saving signal indicates the AL through the cyclic shift value of the second sequence, that is, in this implementation, different cyclic shift values correspond to different ALs. In this way, the cyclic shift value of the second sequence is used to indicate the AL, which can realize that there is no need to newly define or reference other sequences when detecting the downlink control channel, thereby reducing complexity.

In addition, in this implementation, the above energy-saving signal may include multiple signal subsets, wherein one of the signal subsets is used to indicate the above AL. For example, the energy-saving signal is a discovery signal, the discovery signal includes multiple signal subsets, wherein one of the signal subsets is used to indicate the above AL. Or, the above energy-saving signal is a signal subset of a certain signal, for example, is a signal subset of discovery signal.

After detecting a first signal subset, the terminal initiates power rumping. If the terminal receives a second signal subset (i.e., the above AL), the terminal detects the downlink control channel according to this AL, thereby reducing the power consumption of the terminal.

Figure 3:
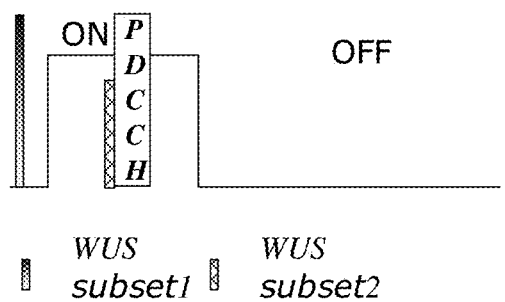
FIG. 3 is a schematic diagram of a WUS according to an embodiment of the present disclosure.

The above energy-saving signal may be a UE specific signal, may be directly used as a discovery signal in the RRC-connected mode, or may be used as a part of the discovery signals. As shown in FIG. 3, the base station first sends a subset 1 of WUS before a DRX on period, and then sends another subset of WUS before the PDCCH, such as a subset 2. The WUS set may be a cyclic shift of a CAZAC sequence, and different cyclic shift values correspond to different aggregation levels of the PDCCH search space. The terminal first detects the subset 1 of WUS and initiates power ramping, but detects the WUS subset 2 instead of the PDCCH. After successfully detecting the WUS subset 2, the data can be determined to arrive and the aggregation level corresponding to the PDCCH is also determined. The terminal directly uses the aggregation level to detect PDCCH, and no longer performs aggregation level blind decoding.

Of course, in the above implementation, in some scenarios, the candidate location may also be indicated by the cyclic shift value of the second sequence, that is, in this implementation, different cyclic shift values correspond to different candidate locations. Or, the cyclic shift value of the second sequence is used to indicate the AL and/or candidate location, for example, the corresponding relationship between the cyclic shift value of the second sequence and the detection information (for example, the AL and/or candidate location) is pre-configured.

Optionally, the energy-saving signal includes the first sequence, wherein an initial value of the first sequence is a terminal identification of the terminal, the input parameter of the first sequence includes the detection information.

Wherein, the above input parameter may be understood as an external input parameter of the first sequence.

In this implementation, it can be realized that, the above detection information (for example: the AL and/or candidate location) may be used as the input parameter of the first sequence. Therefore, after receiving the first sequence, the terminal may obtain the above input parameter through the above initial value and the above first sequence, and thus obtain the above detection information. In this way, it can be realized that there is no need to newly define or reference other sequences when detecting the downlink control channel, thereby reducing complexity.

For example: the above energy-saving signal (for example: UE specific signal) can also be implemented with the PN sequence. The PN sequence has multiple input parameters, terminal identification (UE ID) information is used as the initial value of the PN sequence, the aggregation level corresponding to the PDCCH and the PDCCH candidate location information are used as external input parameters. This sequence may generally be sent before the PDCCH. After detecting the sequence, the terminal can not only determine the aggregation level of the PDCCH, but also determine the PDCCH candidate location information, which greatly reduces the complexity of PDCCH detection.

It should be noted that the above methods for generating the energy-saving signal carrying PDCCH detection information are only specific examples, and other implementation are not excluded.

As an optional implementation, the above energy-saving signal includes a discovery signal, a signal subset of discovery signal, or an On-demand Reference Signal (On-demand RS).

Wherein, the above discovery signal may be a discovery signal in a connected mode. Of course, in some scenarios, it may also be a discovery signal in a non-connected mode.

In addition, when the energy-saving signal includes the On-demand RS, the On-demand RS may be used as a signal subset of the energy-saving signal, and the energy-saving signal may include other signal subsets in addition to the signal subset; or, when the energy-saving signal is the On-demand RS, the On-demand RS may be used as a signal subset of a certain signal, or the On-demand RS may be used as an independent signal, that is, it is not used as a signal subset of a certain signal.

For example: the energy-saving signal (such as the UE specific signal) may also be used as the on-demand RS. As shown in FIG. 4, the terminal starts to detect the WUS signal at the symbol n−L+1. After detecting L symbols of WUS, the terminal is awakened by the WUS at symbol n, and the radio frequency (RF) circuit starts to be powered on; the UE specific on-demand RS is transmitted from the symbol n+x (x>=0) to the symbol n+M. After the terminal successfully detects the on-demand RS, it starts to transmit the PDCCH/PDSCH from the symbol n+M+1. The UE specific on-demand RS may be generated using the aforementioned method. The terminal may use the on-demand RS to detect data arrival and obtain PDCCH detection assistance information. In addition, the on-demand RS may also be used for channel tracking and Radio Resource Management (RRM) measurement and other operations.

As an optional implementation, the energy-saving signal includes at least a first signal subset and a second signal subset, the first signal subset is located before the second signal subset, the second signal subset is at least used to indicate the detection information;

the detecting the downlink control channel by the terminal according to the detection information if the energy-saving signal is detected includes:
initiating power ramping by the terminal if the terminal receives the first signal subset;
detecting the downlink control channel by the terminal according to the detection information if the terminal receives the second signal subset.

In this implementation, it can be realized that the first signal subset wakes up the receiver of the terminal to perform power ramping, and then the second signal subset is detected. After the second signal subset is detected, it starts to detect the downlink control channel according to the detection information. This can further save the power consumption of the terminal, because when the first signal subset is detected, the downlink control channel is not detected, and only power ramp is performed. Instead, the downlink control channel is detected only when the second signal subset is detected. Optionally, the interval between the location of the second signal subset and the location of the downlink control channel may be 0 or less than a preset threshold.

In addition, in this implementation, the case where the energy-saving signal includes multiple signal subsets is introduced. In some implementations, the above energy-saving signal may also be understood as a signal subset of a certain signal. For such implementation of the energy-saving signal, please see the above second signal subset. In other words, the above first signal subset may be understood as another signal, and the second signal subset may be understood as the energy-saving signal.

As an optional implementation, the energy-saving signal includes at least one signal subset, wherein a signal subset for indicating the detection information is frequency-division-multiplexed with the downlink control channel, or the signal subset for indicating the detection information is transmitted before the downlink control channel.

In this implementation, it can be realized that the signal subset for indicating the detection information is frequency-division-multiplexed with the downlink control channel, that is, they are transmitted at the same time, which can improve the working efficiency of the terminal. And time division multiplexing may also be implemented, that is, transmission is not performed at the same time, but the same frequency domain resource may be used for transmission, thereby saving frequency domain resources. It should be noted that, when the energy-saving signal includes only one signal subset, the energy-saving signal is frequency-division-multiplexed with the downlink control channel, or is transmitted before the downlink control channel.

Of course, in the embodiment of the present disclosure, the technical solution in which the signal subset indicating the detection information is transmitted after the downlink control channel is not excluded.

It should be noted that, in the embodiment of the present disclosure, the multiple optional implementations as provided above can be implemented independently or in combination with each other, which is not limited.

The technical solution introduced by the embodiment of the present disclosure can achieve the following:

the energy-saving signal indicates the data arrival, and carries information related to downlink control channel detection, including at least one of the aggregation level and the candidate location information; and the signal may be a discovery signal or an on-demand RS, which may be transmitted as a part of the WUS before the downlink control channel, and may also be used as a WUS construction method in connected mode. For example, the energy-saving signal may be used as the WUS. In this way, not only the arrival time of the downlink control channel can be determined by the energy-saving signal, but also the blind decoding complexity of the downlink control channel can be greatly reduced.

In the embodiment of the present disclosure, the terminal performs energy-saving signal detection, wherein the energy-saving signal is at least used to indicate the detection information of the downlink control channel; if the energy-saving signal is detected, the terminal detects the downlink control channel according to the detection information. In this way, it can be realized that the downlink control channel detection is triggered by the above energy-saving signal, and the detection can be directly performed by the detection information indicated by the energy-saving signal, thereby reducing the power consumption of the terminal.

Referring to FIG. 5, it is a flowchart of another downlink control channel detection method according to an embodiment of the present disclosure. As shown in FIG. 5, it includes the following step:

501, sending an energy-saving signal by a network side device, wherein the energy-saving signal is at least used to indicate detection information of a downlink control channel, so that a terminal detects the downlink control channel according to the detection information if the terminal detects the energy-saving signal.

Optionally, the energy-saving signal is further used to indicate data arrival and the detection information.

Optionally, the detection information includes at least one of:

an AL and/or a candidate location.

Optionally, the energy-saving signal indicates the detection information through at least one of:

a target sequence, an input parameter of a first sequence, and a cyclic shift value of a second sequence, wherein the target sequence is a function of a third sequence.

Optionally, the first sequence includes a PN sequence, an orthogonal sequence, or a CAZAC sequence; and/or the second sequence includes an orthogonal sequence, a CAZAC sequence, or a PN sequence; and/or the third sequence includes a demodulation reference signal (DMRS) sequence of the downlink control channel.

Optionally, the detection information includes the AL, the energy-saving signal includes the target sequence, the target sequence is used to indicate the AL and data arrival; or the detection information includes the AL, the energy-saving signal includes the cyclic shift value of the second sequence, the cyclic shift value of the second sequence is used to indicate the AL; or the energy-saving signal includes the first sequence, wherein an initial value of the first sequence is a terminal identification of the terminal, the input parameter of the first sequence includes the detection information.

Optionally, the energy-saving signal includes a discovery signal, a signal subset of discovery signal, or an On-demand RS.

Optionally, the energy-saving signal includes at least a first signal subset and a second signal subset, the first signal subset is located before the second signal subset, the second signal subset is at least used to indicate the detection information.

Optionally, the energy-saving signal includes at least one signal subset, wherein a signal subset for indicating the detection information is frequency-division-multiplexed with the downlink control channel, or the signal subset for indicating the detection information is transmitted before the downlink control channel.

It should be noted that, this embodiment is used as an implementation of the network side device corresponding to the embodiment shown in FIG. 2, and for the specific implementations thereof, please refer to the related description of the embodiment shown in FIG. 2. In order to avoid repetitive description, this embodiment will not be detailed again, and the same beneficial effects can be achieved.

Referring to FIG. 6, it is a structural diagram of a terminal according to an embodiment of the present disclosure. As shown in FIG. 6, the terminal 600 includes:

a first detection module 601 configured to perform energy-saving signal detection, wherein the energy-saving signal is at least used to indicate detection information of a downlink control channel;

a second detection module 602 configured to detect the downlink control channel according to the detection information if the energy-saving signal is detected.

Optionally, the energy-saving signal is used to indicate data arrival and the detection information.

Optionally, the detection information includes at least one of:

an aggregation level (AL) and/or a candidate location.

Optionally, the energy-saving signal indicates the detection information through at least one of:

a target sequence, an input parameter of a first sequence, and a cyclic shift value of a second sequence, wherein the target sequence is a function of a third sequence.

Optionally, the first sequence includes a pseudo-noise (PN) sequence, an orthogonal sequence, or a constant amplitude zero auto correlation (CAZAC) sequence; and/or the second sequence includes an orthogonal sequence, a CAZAC sequence, or a PN sequence; and/or the third sequence includes a demodulation reference signal (DMRS) sequence of the downlink control channel.

Optionally, the detection information includes the AL, the energy-saving signal includes the target sequence, the target sequence is used to indicate the AL and data arrival;

the first detection module 601 is configured to use a sequence corresponding to the DMRSs of multiple ALs to perform correlation peak detection on the target sequence, and to use an AL corresponding to a maximum correlation peak among the multiple ALs as the AL indicated by the target sequence, wherein the maximum correlation peak is greater than a preset threshold.

Optionally, the detection information includes the AL, the energy-saving signal includes the cyclic shift value of the second sequence, the cyclic shift value of the second sequence is used to indicate the AL; or the energy-saving signal includes the first sequence, wherein an initial value of the first sequence is a terminal identification of the terminal, the input parameter of the first sequence includes the detection information.

Optionally, the energy-saving signal includes a discovery signal, a signal subset of discovery signal, or an on-demand reference signal (On-demand RS).

Optionally, the energy-saving signal includes at least a first signal subset and a second signal subset, the first signal subset is located before the second signal subset, the second signal subset is at least used to indicate the detection information; the second detection module 602 is configured to: if the terminal receives the first signal subset, initiate power ramping; and if the terminal receives the second signal subset, detect the downlink control channel according to the detection information.

Optionally, the energy-saving signal includes at least one signal subset, wherein a signal subset for indicating the detection information is frequency-division-multiplexed with the downlink control channel, or the signal subset for indicating the detection information is transmitted before the downlink control channel.

It should be noted that, the above terminal 600 in this embodiment may be a terminal of any implementation in the method embodiment in the embodiments of the present disclosure. Any implementation of the terminal in the method embodiment in the embodiments of the disclosure may be achieved by the above terminal 600 in this embodiment, and achieves the same beneficial effects, which will not be repeated here.

Referring to FIG. 7, it is a structural diagram of a network side device according to an embodiment of the present disclosure. As shown in FIG. 7, the network side device 700 includes:

a sending module 701 configured to send an energy-saving signal, wherein the energy-saving signal is at least used to indicate detection information of a downlink control channel, so that the terminal detects the downlink control channel according to the detection information if the terminal detects the energy-saving signal.

Optionally, the energy-saving signal is used to indicate data arrival and the detection information.

Optionally, the detection information includes at least one of:

an aggregation level (AL) and/or a candidate location.

Optionally, the energy-saving signal indicates the detection information through at least one of:

a target sequence, an input parameter of a first sequence, and a cyclic shift value of a second sequence, wherein the target sequence is a function of a third sequence.

Optionally, the first sequence includes a PN sequence, an orthogonal sequence, or a CAZAC sequence; and/or the second sequence includes an orthogonal sequence, a CAZAC sequence, or a PN sequence; and/or the third sequence includes a demodulation reference signal (DMRS) sequence of the downlink control channel.

Optionally, the detection information includes the AL, the energy-saving signal includes the target sequence, the target sequence is used to indicate the AL and data arrival; or the detection information includes the AL, the energy-saving signal includes the cyclic shift value of the second sequence, the cyclic shift value of the second sequence is used to indicate the AL; or the energy-saving signal includes the first sequence, wherein an initial value of the first sequence is a terminal identification of the terminal, the input parameter of the first sequence includes the detection information.

Optionally, the energy-saving signal includes a discovery signal, a signal subset of discovery signal, or an On-demand RS.

Optionally, the energy-saving signal includes at least a first signal subset and a second signal subset, the first signal subset is located before the second signal subset, the second signal subset is at least used to indicate the detection information.

Optionally, the energy-saving signal includes at least one signal subset, wherein a signal subset for indicating the detection information is frequency-division-multiplexed with the downlink control channel, or the signal subset for indicating the detection information is transmitted before the downlink control channel.

It should be noted that, the above network side device 700 in this embodiment may be a network side device of any implementation in the method embodiment in the embodiments of the present disclosure. Any implementation of the network side device in the method embodiment in the embodiments of the disclosure may be achieved by the above network side device 700 in this embodiment, and achieves the same beneficial effects, which will not be repeated here.

Figure 8:
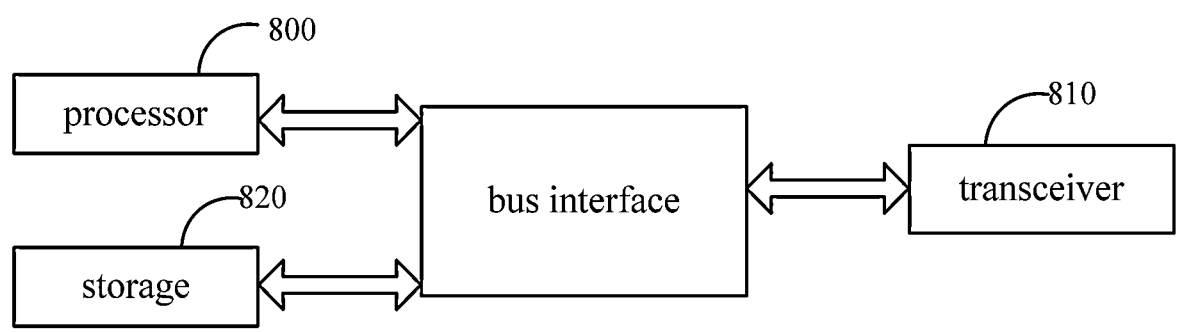
FIG. 8 is a structural diagram of another terminal according to an embodiment of the present disclosure.

Referring to FIG. 8, it is a structural diagram of another terminal according to an embodiment of the present disclosure. As shown in FIG. 8, the terminal includes: a transceiver 810, a storage 820, a processor 800, and a program stored on the storage 820 and capable of running on the processor 800, wherein:

the transceiver 810 is configured to perform energy-saving signal detection, wherein the energy-saving signal is at least used to indicate detection information of the downlink control channel; and the transceiver 810 is further configured to detect the downlink control channel according to the detection information if the energy-saving signal is detected.

Wherein the transceiver 810 may be configured to receive and send data under the control of the processor 800.

In FIG. 8, the bus architecture may include any number of interconnected buses and bridges, which are linked together specifically by various circuits such as one or more processors represented by the processor 800 and the storage represented by the storage 820. The bus architecture can also link various other circuits such as peripheral devices, voltage regulators, and power management circuits, etc., which are well known in the art, and therefore, they will not be further described herein. The bus interface provides interfaces. The transceiver 800 may be a plurality of elements, including a transmitter and a receiver, and provides units for communicating with various other devices on a transmission medium.

The processor 800 is responsible for managing the bus architecture and general processing, and the storage 820 may store data used by the processor 800 when performing operations.

It should be noted that the storage 820 is not limited to being only on the terminal, and the storage 820 and the processor 800 may be separated in different geographic locations.

Optionally, the energy-saving signal is used to indicate data arrival and the detection information.

Optionally, the detection information includes at least one of:
an aggregation level (AL) and/or a candidate location.

Optionally, the energy-saving signal indicates the detection information through at least one of:
a target sequence, an input parameter of a first sequence, and a cyclic shift value of a second sequence, wherein the target sequence is a function of a third sequence.

Optionally, the first sequence includes a pseudo-noise (PN) sequence, an orthogonal sequence, or a CAZAC sequence; and/or
the second sequence includes an orthogonal sequence, a CAZAC sequence, or a PN sequence; and/or
the third sequence includes a demodulation reference signal (DMRS) sequence of the downlink control channel.

Optionally, the detection information includes the AL, the energy-saving signal includes the target sequence, the target sequence is used to indicate the AL and data arrival;
The performing energy-saving signal detection includes:
performing correlation peak detection on the target sequence using a sequence corresponding to the DMRSs of multiple ALs, and using an AL corresponding to a maximum correlation peak among the multiple ALs as the AL indicated by the target sequence, wherein the maximum correlation peak is greater than a preset threshold.

Optionally, the detection information includes the AL, the energy-saving signal includes the cyclic shift value of the second sequence, the cyclic shift value of the second sequence is used to indicate the AL; or
the energy-saving signal includes the first sequence, wherein an initial value of the first sequence is a terminal identification of the terminal, the input parameter of the first sequence includes the detection information.

Optionally, the energy-saving signal includes a discovery signal, a signal subset of discovery signal, or an on-demand reference signal (On-demand RS).

Optionally, the energy-saving signal includes at least a first signal subset and a second signal subset, the first signal subset is located before the second signal subset, the second signal subset is at least used to indicate the detection information;
the detecting the downlink control channel according to the detection information if the energy-saving signal is detected includes: if the terminal receives the first signal subset, initiating power ramping; if the terminal receives the second signal subset, detecting the downlink control channel according to the detection information.

Optionally, the energy-saving signal includes at least one signal subset, wherein a signal subset for indicating detection information is frequency-division-multiplexed with the downlink control channel, or the signal subset for indicating the detection information is transmitted before the downlink control channel.

It should be noted that, the above terminal in this embodiment may be a terminal of any implementation in the method embodiment in the embodiments of the present disclosure. Any implementation of the terminal in the method embodiment in the embodiments of the disclosure may be achieved by the above terminal in this embodiment, and achieves the same beneficial effects, which will not be repeated here.

Figure 9:
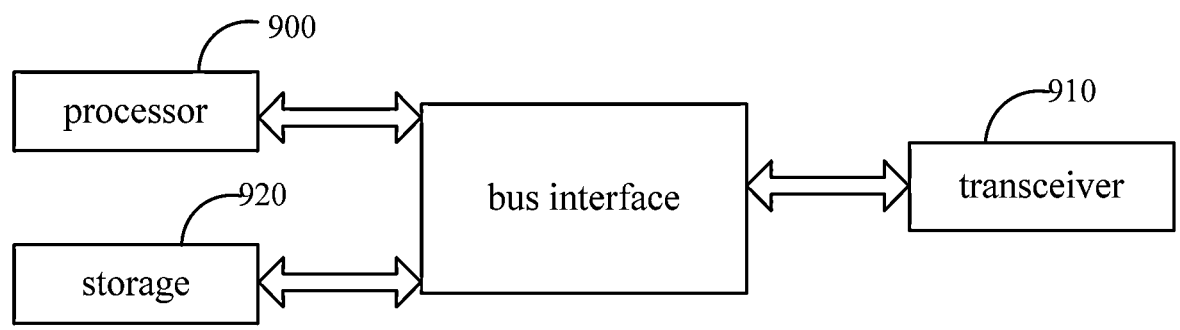
FIG. 9 is a structural diagram of another network side device according to an embodiment of the present disclosure.

Referring to FIG. 9, it is a structural diagram of another network side device according to an embodiment of the present disclosure. As shown in FIG. 9, the network side device includes: a transceiver 910, a storage 920, a processor 900, and a program stored on the storage 920 and capable of running on the processor, wherein,
the transceiver 910 is configured to send an energy-saving signal, wherein the energy-saving signal is at least used to indicate detection information of a downlink control channel, so that a terminal detects the downlink control channel according to the detection information if the terminal detects the energy-saving signal.

Wherein the transceiver 910 may be configured to receive and send data under the control of the processor 900.

In FIG. 9, the bus architecture may include any number of interconnected buses and bridges, which are linked together specifically by various circuits such as one or more processors represented by the processor 900 and the storage represented by the storage 920. The bus architecture can also link various other circuits such as peripheral devices, voltage regulators, and power management circuits, etc., which are well known in the art, and therefore, they will not be further described herein. The bus interface provides interfaces. The transceiver 910 may be a plurality of elements, including a transmitter and a receiver, and provides units for communicating with various other devices on a transmission medium.

The processor 900 is responsible for managing the bus architecture and general processing, and the storage 920 may store data used by the processor 800 when performing operations.

It should be noted that the storage 920 is not limited to being only on the terminal, and the storage 920 and the processor 900 may be separated in different geographic locations.

Optionally, the energy-saving signal is used to indicate data arrival and the detection information.

Optionally, the detection information includes at least one of:
an AL and/or a candidate location.

Optionally, the energy-saving signal indicates the detection information through at least one of:
a target sequence, an input parameter of a first sequence, and a cyclic shift value of a second sequence, wherein the target sequence is a function of a third sequence.

Optionally, the first sequence includes a PN sequence, an orthogonal sequence, or a CAZAC sequence; and/or
the second sequence includes an orthogonal sequence, a CAZAC sequence, or a PN sequence; and/or
the third sequence includes a demodulation reference signal (DMRS) sequence of the downlink control channel.

Optionally, the detection information includes the AL, the energy-saving signal includes the target sequence, the target sequence is used to indicate the AL and data arrival; or
the detection information includes the AL, the energy-saving signal includes the cyclic shift value of the second sequence, the cyclic shift value of the second sequence is used to indicate the AL; or the energy-saving signal includes the first sequence, wherein an initial value of the first sequence is a terminal identification of the terminal, the input parameter of the first sequence includes the detection information.

Optionally, the energy-saving signal includes a discovery signal, a signal subset of discovery signal, or an On-demand RS.

Optionally, the energy-saving signal includes at least a first signal subset and a second signal subset, the first signal subset is located before the second signal subset, the second signal subset is at least used to indicate the detection information.

Optionally, the energy-saving signal includes at least one signal subset, wherein a signal subset for indicating the detection information is frequency-division-multiplexed with the downlink control channel, or the signal subset for indicating the detection information is transmitted before the downlink control channel.

It should be noted that, the above network side device in this embodiment may be a network side device of any implementation in the method embodiment in the embodiments of the present disclosure. Any implementation of the network side device in the method embodiment in the embodiments of the disclosure may be achieved by the above network side device in this embodiment, and achieves the same beneficial effects, which will not be repeated here.

An embodiment of the present disclosure further provides a computer readable storage medium having a computer program stored thereon, the program implementing, when executed by a processor, the steps in the downlink control channel detection method at a terminal side provided by the embodiment of the present disclosure, or, the program implementing, when executed by a processor, the steps in the downlink control channel detection method at a network side device side provided by the embodiment of the present disclosure.

In the several embodiments provided in this application, it will be appreciated that the disclosed methods and devices can be implemented in other ways. For example, the device embodiments described above are merely illustrative. For example, the division of the units is only a logical function division, and there may be other divisions in actual implementation, for example, multiple units or components may be combined or integrated into another system, or some features may be ignored or not implemented. In addition, the displayed or discussed mutual coupling or direct coupling or communication connection may be indirect coupling or communication connection through some interfaces, devices or units, and may be in electrical, mechanical or other forms.

In addition, the functional units in the various embodiments of the present disclosure may be integrated into one processing unit, or each unit may be separately physically included, or two or more units may be integrated into one unit. The above-mentioned integrated unit can be realized in the form of hardware or in the form of hardware plus software functional units.

The above integrated unit implemented in the form of a software functional unit may be stored in a computer readable storage medium. The above software functional unit is stored in a storage medium and includes several instructions to make a computer device (which may be a personal computer, a server, or a network device, etc.) execute part of the steps of the processing method of the information data block described in the various embodiments of the present disclosure. The aforementioned storage medium include various media that can store program codes, such as: a U disk, a mobile hard disk, a Read-Only Memory (ROM), a Random Access Memory (RAM), a magnetic disk or an optical disk, etc.

The above are optional implementations of the present disclosure. It should be noted that for those of ordinary skill in the art, without departing from the principles described in the present disclosure, several improvements and modifications can be made. These improvements and modifications should also be regarded as the protective scope of the present disclosure.

What is claimed is:

1. A downlink control channel detection method, applied to a terminal in a Discontinuous Reception (DRX) scenario, wherein each DRX period comprises a DRX On Duration and a DRX OFF Duration, the method comprising:
   detecting, by the terminal, an energy-saving signal received from a network-side device in the DRX On Duration, wherein the energy-saving signal is at least used to indicate detection information of a downlink control channel; and
   detecting the downlink control channel by the terminal according to the detection information if the energy-saving signal is detected,
   wherein the detection information comprises an aggregation level (AL);
   wherein, the energy-saving signal comprises a target sequence, the target sequence is used to indicate the AL and arrival of data from the network-side device.

2. The method according to claim 1, wherein the energy-saving signal further comprises at least one of:
   an input parameter of a first sequence, and a cyclic shift value of a second sequence, wherein the target sequence is a function of a third sequence.

3. The method according to claim 2, wherein the first sequence comprises a pseudo-noise (PN) sequence, an orthogonal sequence, or a constant amplitude zero auto correlation (CAZAC) sequence; and/or
   the second sequence comprises an orthogonal sequence, a CAZAC sequence, or a PN sequence; and/or
   the third sequence comprises a demodulation reference signal (DMRS) sequence of the downlink control channel.

4. The method according to claim 2, wherein the performing energy-saving signal detection by the terminal comprises:
   performing, by the terminal, a correlation peak detection on the target sequence using a sequence corresponding to the DMRSs of multiple ALs, and using an AL corresponding to a maximum correlation peak among the multiple ALs as the AL indicated by the target sequence, wherein the maximum correlation peak is greater than a preset threshold.

5. The method according to claim 2, wherein the detection information comprises the AL, the energy-saving signal comprises the cyclic shift value of the second sequence, the cyclic shift value of the second sequence is used to indicate the AL; or
   the energy-saving signal comprises the first sequence, wherein an initial value of the first sequence is a terminal identification of the terminal, the input parameter of the first sequence comprises the detection information.

6. The method according to claim 1, wherein the energy-saving signal comprises a discovery signal, a signal subset of discovery signal, or an on-demand reference signal (On-demand RS).

7. The method according to claim 1, wherein the energy-saving signal comprises at least a first signal subset and a second signal subset, the first signal subset is located before the second signal subset, the second signal subset is at least used to indicate the detection information;
    detecting the downlink control channel by the terminal according to the detection information if the energy-saving signal is detected comprises:
    initiating power ramping by the terminal if the terminal receives the first signal subset;
    detecting the downlink control channel by the terminal according to the detection information if the terminal receives the second signal subset.

8. A terminal, comprising: a transceiver, a storage, a processor, and a program stored on the storage and capable of running on the processor, wherein the program implementing, when executed by the processor, the steps of downlink control channel detection method according to claim 1.

9. A downlink control channel detection method, applied to a network side device in a Discontinuous Reception (DRX) scenario, wherein each DRX period comprises a DRX On Duration and a DRX OFF Duration, the method comprising:
    sending an energy-saving signal by the network side device in the DRX On Duration, wherein the energy-saving signal is at least used to indicate detection information of a downlink control channel, the detection information is used for a terminal to detect the downlink control channel after the energy-saving signal is detected;
    wherein the detection information comprises an aggregation level (AL);
    wherein the energy-saving signal comprises a target sequence, the target sequence is used to indicate the AL and arrival of data from the network-side device.

10. The method according to claim 9, wherein the energy-saving signal further comprises at least one of:
    an input parameter of a first sequence, and a cyclic shift value of a second sequence, wherein the target sequence is a function of a third sequence.

11. The method according to claim 10, wherein the first sequence comprises a PN sequence, an orthogonal sequence, or a CAZAC sequence; and/or
    the second sequence comprises an orthogonal sequence, a CAZAC sequence, or a PN sequence; and/or
    the third sequence comprises a demodulation reference signal (DMRS) sequence of the downlink control channel.

12. The method according to claim 10, wherein
    the detection information comprises the AL, the energy-saving signal comprises the cyclic shift value of the second sequence, the cyclic shift value of the second sequence is used to indicate the AL; or
    the energy-saving signal comprises the first sequence, wherein an initial value of the first sequence is a terminal identification of the terminal, the input parameter of the first sequence comprises the detection information.

13. The method according to claim 9, wherein the energy-saving signal comprises a discovery signal, a signal subset of discovery signal, or an On-demand RS.

14. The method according to claim 9, wherein the energy-saving signal comprises at least a first signal subset and a second signal subset, the first signal subset is located before the second signal subset, the second signal subset is at least used to indicate the detection information.

15. A network side device, comprising: a transceiver, a storage, a processor, and a program stored on the storage and capable of running on the processor, wherein the program, when executed by the processor, performs the steps of downlink control channel detection method according to claim 9.

16. A computer readable storage medium having a computer program stored thereon, the program implementing, when executed by a processor, steps of a downlink control channel detection method, wherein the method is applied to a terminal in a Discontinuous Reception (DRX) scenario, each DRX period comprises a DRX On Duration and a DRX OFF Duration, the method comprising:
    detecting, by the terminal in the DRX On Duration, an energy-saving signal received from a network-side device, wherein the energy-saving signal is at least used to indicate detection information of a downlink control channel; and
    detecting the downlink control channel by the terminal according to the detection information if the energy-saving signal is detected,
    wherein the detection information comprises an aggregation level (AL);
    wherein the energy-saving signal comprises a target sequence, the target sequence is used to indicate the AL and arrival of data from the network-side device;
    or,
    the program implementing, when executed by a processor, steps of a downlink control channel detection method, wherein the method is applied to a network side device in a Discontinuous Reception (DRX) scenario, each DRX period comprises a DRX On Duration and a DRX OFF Duration, the method comprising:
    sending an energy-saving signal by the network side device in the DRX On Duration, wherein the energy-saving signal is at least used to indicate detection information of a downlink control channel, the detection information is used for a terminal to detect the downlink control channel after the energy-saving signal is detected,
    wherein the detection information comprises an aggregation level (AL);
    wherein the energy-saving signal comprises a target sequence, the target sequence is used to indicate the AL and arrival of data from the network-side device.

* * * * *